United States Patent
Runge et al.

(10) Patent No.: US 7,315,094 B2
(45) Date of Patent: Jan. 1, 2008

(54) BUS STATION IN A VEHICLE

(75) Inventors: Holger Runge, Hildesheim (DE); Sven Bauer, Hildesheim (DE); Peter Siepen, Oberhausen (DE); Michael Wollborn, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 492 days.

(21) Appl. No.: 10/479,767

(22) PCT Filed: May 22, 2002

(86) PCT No.: PCT/DE02/01839

§ 371 (c)(1),
(2), (4) Date: Aug. 6, 2004

(87) PCT Pub. No.: WO02/000045

PCT Pub. Date: Dec. 12, 2002

(65) Prior Publication Data

US 2004/0251742 A1  Dec. 16, 2004

(30) Foreign Application Priority Data

Jun. 6, 2001  (DE) ............................. 101 27 327

(51) Int. Cl.
B60L 1/00 (2006.01)

(52) U.S. Cl. .................................. 307/9.1; 307/10.1

(58) Field of Classification Search ................. 307/9.1, 307/10.1
See application file for complete search history.

(56) References Cited

U.S. PATENT DOCUMENTS

| | | | | |
|---|---|---|---|---|
| 5,957,985 | A | * | 9/1999 | Wong et al. ................... 701/33 |
| 6,662,259 | B1 | * | 12/2003 | Lin et al. ..................... 710/313 |
| 6,754,854 | B2 | * | 6/2004 | Kurrasch ...................... 714/47 |
| 2004/0044420 | A1 | * | 3/2004 | Dinges et al. ................ 700/17 |

FOREIGN PATENT DOCUMENTS

DE  41 10 372  11/1993

(Continued)

OTHER PUBLICATIONS

Sonderausgabe von ATZ und Automotive Engineering Partners: Interiror Partners. Designstudien. Das Integrate Cockpit der Zukunft. S. Aug. 11, 2000, see English summary, p. 9.

(Continued)

*Primary Examiner*—Robert L DeBeradinis
(74) *Attorney, Agent, or Firm*—Kenyon & Kenyon LLP

(57) ABSTRACT

A bus station for connection to a bus in a motor vehicle, including a basic module as well as expansion modules. The basic station can access the expansion and basic modules of other bus stations via the bus for a called-up service. This enables configuration of infotainment systems in motor vehicles according to a modular design.

14 Claims, 3 Drawing Sheets

FOREIGN PATENT DOCUMENTS

| | | |
|---|---|---|
| DE | 69203039 | 2/1996 |
| DE | 196 00 644 | 4/1997 |
| DE | 196 25 002 | 1/1998 |
| DE | 19811235 | 9/1999 |
| DE | 198 53 665 | 5/2000 |
| DE | 199 63 610 | 11/2000 |
| EP | 875 422 | 11/1998 |
| EP | 1 068 983 | 1/2001 |
| WO | WO 89/02141 | 3/1989 |
| WO | 99 48021 | 9/1999 |
| WO | 00 77621 | 12/2000 |

OTHER PUBLICATIONS

Rebel M et al: "Integrating IEEE 1394 as Infotainment Backbone Into the Automotive Environment" VTC 2001 Spring. IEEE VTS 53$^{rd}$. Vehicular Technology Conference Rhodes, Greece, May 6-9, 2001, IEEE Vehicular Technology Conference, New York, NY: IEEE, US, Bd. 3 of 4. Conf. 53 May 6, 2001, Seiten 2026-2031, XP001082499 ISBN: 0-7803-6728-6 Abschnitte 6. "Distributed Gateways" und 7. "Conclusion" Seite 2030—Seite 2031; Abbildungen 8,9.

* cited by examiner

BUS STATION IN A VEHICLE

FIELD OF THE INVENTION

The present invention relates to a bus station.

BACKGROUND INFORMATION

It is already understood that components in a vehicle may be connected via a bus. The components are then bus stations. Examples of such buses include the CAN bus and the Firewire bus.

SUMMARY OF THE INVENTION

In contrast, the bus station of the exemplary embodiment of the present invention may have the advantage that the bus station allows a bus system to be configured quickly and flexibly according to a modular design, so that current technology and standards of the entertainment industry or of the motor vehicle industry can be adopted quickly. Distributing the resources among different bus stations allows for the services to be independent of the physical bus medium and the support of different bus systems. Moreover, the divided resource utilization may result in independence of the available hardware of each bus station at which the application is being performed. Furthermore, it may be advantageous that the exemplary bus station enables simple upgrading also in the field by adding and/or exchanging sub-systems. It may be further advantageous that the basic module regulates communication with the first bus, i.e., the bus connecting the bus stations, so that the individual devices connected to the second bus as expansion modules, such as a graphics/video system, an audio system, or communications systems, do not require interfaces or communications software for this first bus. This simplifies the manufacture and provision of such expansion modules.

Due to the modularity of the proposed system on the hardware and software level, components may be reused extensively. The flexibility of the bus stations allows the use of a fixed bus system to which various components may be added as needed. This may significantly decrease the expenditure for generating a concrete system (system assembly). The addition of bus stations on the hardware as well as software level is particularly simple as a result of the proposed bus station. As a result, new developments from the entertainment sector in particular are able to be integrated into such systems especially quickly. It may also be particularly simple to update the software of the individual expansion modules or of the basic module as a result of the modularity. Software modules of the driver and middleware as well as of the application level are able to be replaced by new, revised, and enhanced versions also via radio via a send/receive station, for example. The modularity of the system also fundamentally ensures the update capacity of the individual hardware components.

It may be particularly advantageous that the basic module is configured as a bus master for the second bus. Additional buses can also be present, the basic module also being able to act as a bus master for these buses. The individual expansion modules are then slaves that are controlled by the bus master. This is a particularly simple design for a bus. The first bus, the global vehicle bus, may also be configured according to the master-slave or the multi-master principle.

Moreover, it may be advantageous that the basic module is able to control the communication of the expansion modules that are connected to its second bus with other bus stations. As a result, expansion modules are not required to implement the mechanisms for exchanging data via the global vehicle bus. This feature also simplifies the configuration of expansion modules having commercial components that are not developed specifically for the proposed bus station.

Safety-related expansion modules to which non-designated or unauthorized access is prevented may also be provided so that these expansion modules are available at any time for their safety-critical applications and misuse is prevented. The access control is implemented by the basic module of the bus station.

It may be further advantageous that at least one expansion module may be configured as a send/receive station via which access to the bus station is possible from outside of the vehicle. As a result, remote maintenance or remote update of the individual expansion modules, for example, is possible with respect to the software. Moreover, a send/receive station enables loading of data desired by the vehicle occupants, such as music, multimedia data, traffic information, route data, or other information.

It may be also advantageous that an application, such as DVD play, is able to access the resources of all bus stations. The entirety of the modules of a bus station is not required to form a closed device in the conventional sense, such as a DVD player. However, a second application may use the same resources. The DVD drive, for example, may also be used for reading map data for a navigational application. In the event that a plurality of equivalent resources of the bus stations of the system is available, a resource may be selected as a function of bus load and bandwidth requirements.

Finally, it may be also advantageous that a bus is provided for connecting the bus stations, and a corresponding basic module is used as an interface between the first and the second bus. Furthermore, this basic module as described above is configured as a bus master for the second bus.

DETAILED DESCRIPTION

Infotainment components, such as a car radio, navigation, mobile telephone, storage drives, such as a CD ROM, are being increasingly installed in motor vehicles for use by the vehicle occupants. Since the development of such electronic components continues to accelerate and the number of these electronic components is also increasing, networking of these components as well as simple expansion or interchangeability are necessary. This expansion and interchangeability relate in this context to the hardware as well as to the software. In this context, for example, the functionality of a device may be largely determined by the software and the hardware may be able to remain unchanged.

The exemplary embodiments of the present invention provide a bus station that provides a modular, partitioned platform for multimedia, navigation, communication, and telematics systems. In this context, the division of the bus station of the invention into a basic module and expansion modules is particularly crucial. This allows quick and flexible assembly according to the modular design principle. Moreover, current technology and standards from the entertainment industry are consequently able to be quickly adopted. Bus stations are connected to a global vehicle bus in this context and each one has its own bus to which the individual expansion modules are connected.

In the following, the term service refers to an application called up either automatically or by a user. An example of such a service would be the playing of a video clip, the bus station being able to use resources, such as computing capacity, data storage, display, audio playback system for decoding the image files, from various bus stations.

Figure 1:
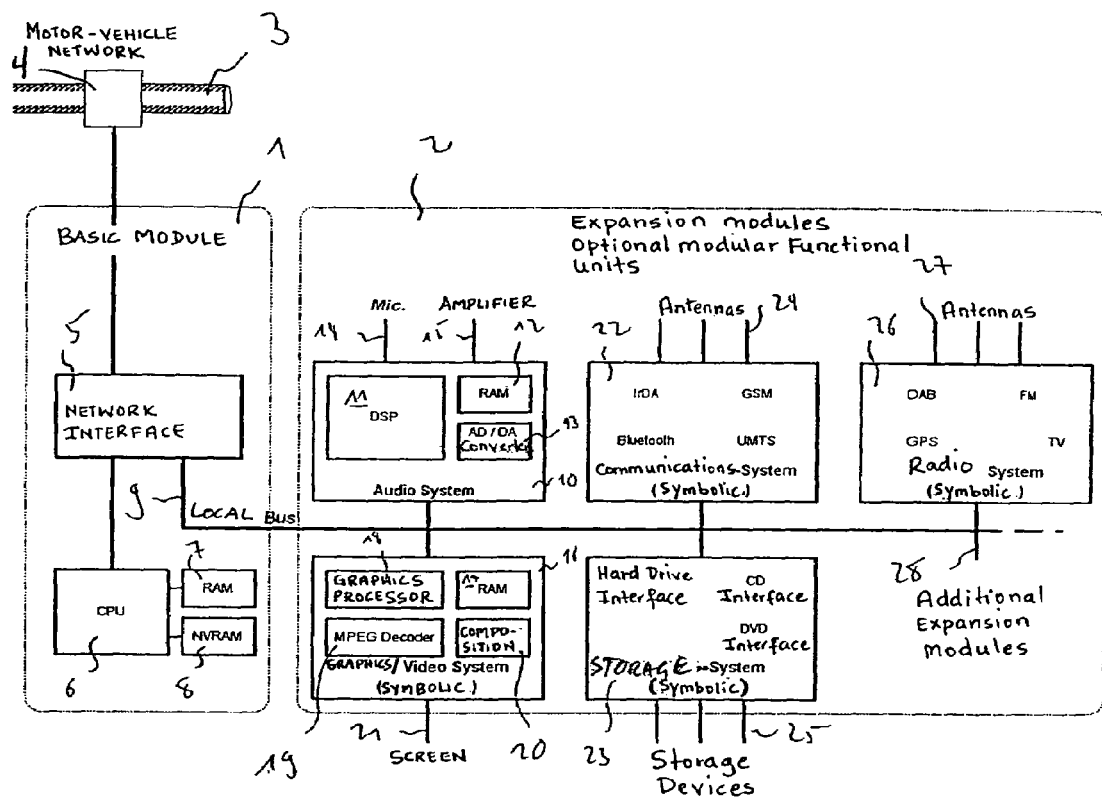
FIG. 1 shows a block diagram of an exemplary bus station according to the present invention.

FIG. 1 shows a block diagram of an exemplary bus station of the present invention. The bus station has a basic module 1 and expansion modules 2. Expansion modules 2 are modular functional units, such as an audio system 10, a communications system 22, a radio system 26, a storage system 23, and a graphics/video system 16. However, additional expansion modules may also be connected in this instance. These expansion modules are connected to a local bus 9 of the bus station. Basic module 1 has a network interface 5, which on the one side connects to a motor-vehicle bus 3, the global vehicle bus, which is connected via an interface 4 to the bus station, and on the other side is connected to local bus 9 as well as the components in the basic module, i.e., a CPU (central processing unit) 6 and memory, a RAM 7, and a non-volatile memory 8. A so-call NV (non-volatile) RAM can be used as non-volatile memory 8.

Basic module 1 ensures that data to be transmitted from expansion modules 10, 16, 22, 23, and 26 via local bus 9 to other bus stations is transmitted via bus 3 to these bus stations. Basic module 1 provides the software so that expansion modules 10, 16, 22, 23, and 26 are able to access the resources, i.e., hardware and software components of other bus stations. In this context, the resources of the basic modules as well as of the expansion modules are used. Furthermore, basic module 1 ensures that the expansion modules are also able to use resources reciprocally via bus 9. Safety-related expansion modules are particularly protected by the software of basic module 1 from external access.

Audio system 10 has a digital signal processor 11, a memory 12, and an AD (analog-digital) and DA (digital-analog) converter 13. Two interfaces 14 and 15 lead on the one side to an amplifier and on the other side to a microphone. Graphics and video system 16 has a graphics processor 18, an MPEG/H26x decoder 19, a memory 17, and a compositor 20, compositor 20 enabling the combination of graphics and video data from different sources.

Communications system 22 supports in this instance a plurality of communications protocols such as UMTS, GSM, Bluetooth, and IrDA. Alternatively, communications system 22 may support only one standard more or less than indicated. Communications system 22 has connections to antennas 24. Storage system 23 has interfaces to hard drives, CD ROMs, and DVDs via connections 25. Radio system 26 uses in this instance GPS for location finding, for example to provide location-related data, and supports digital radio, e.g. DVB (digital video broadcasting), FM, and DAB (digital audio broadcasting). Radio system 26 has connections 27 to antennas. Additional expansion modules 28 are able to be connected here. This includes navigational devices, for example.

Figure 2:
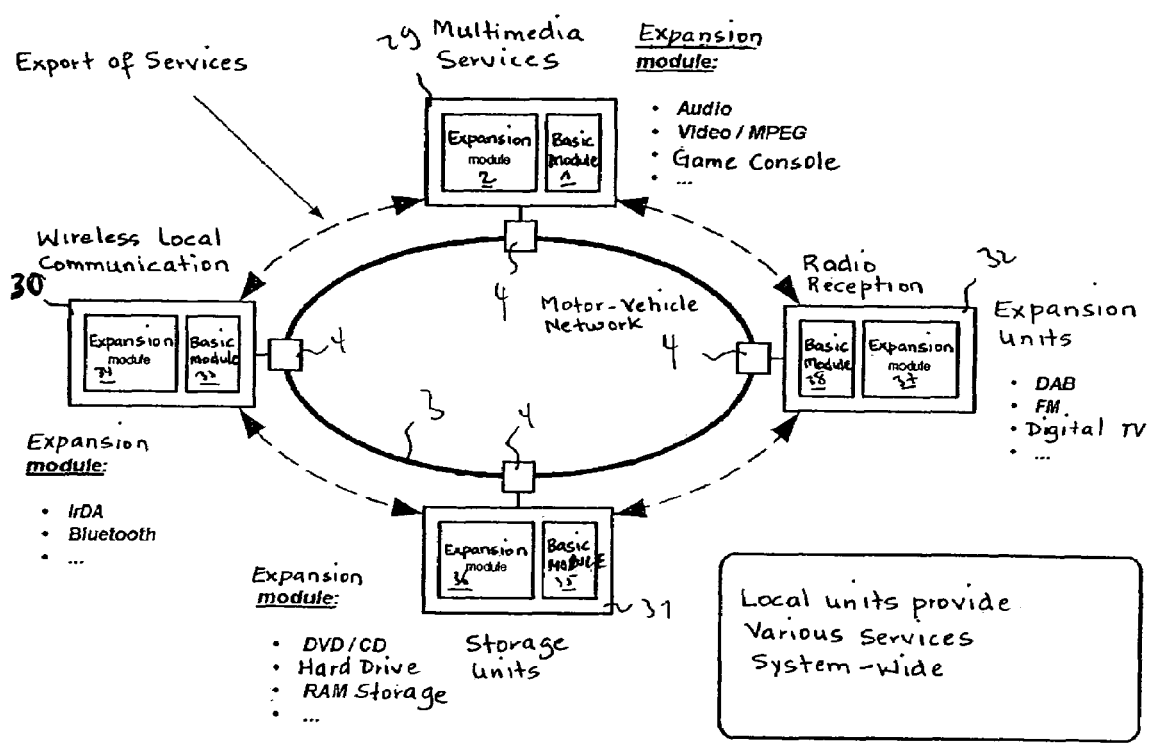
FIG. 2 shows a block diagram of an exemplary bus according to the present invention.

FIG. 2 shows the configuration of the entire system. Bus stations 29, 30, 31, and 32 are connected via connections 4 to motor-vehicle bus 3, a multimedia-compatible bus, such as MOST or IEEE 1394-B, which is a multi-master bus. Bus station 29 has basic module 1 and expansion modules 2. Expansion modules for audio, video, MPEG, and a game console are supported here. Bus station 30 is responsible for wireless communication with receivers inside and outside of the vehicle. It has basic module 33 and expansion modules 34. The expansion modules include IrDA, Bluetooth, GSM, UMTS, GPRS, etc.

Bus station 31 has basic module 35 and expansion modules 36. In this instance, the expansion modules include DVD, CD, a hard drive, and other memories. Bus station 32 is ultimately responsible for radio reception. It has basic module 38 and expansion modules 37. The expansion modules include DAB, FM, digital TV, and other broadcasting standards. A comparison of FIG. 1 and FIG. 2 shows that different functionalities may be connected with one another via local bus 9 in a bus station. However, it is possible to distribute the expansion modules of the application to different bus stations. Bus 3 allows different services and resources to be exchanged between bus stations 29 through 32. This is represented by the double arrow with the dashed line. The addition of further bus stations allows the addition of further modules that enable the implementation of additional functionalities. An example of this is the addition of wireless communications interfaces, which enables use of an organizer or notebook.

Figure 3:
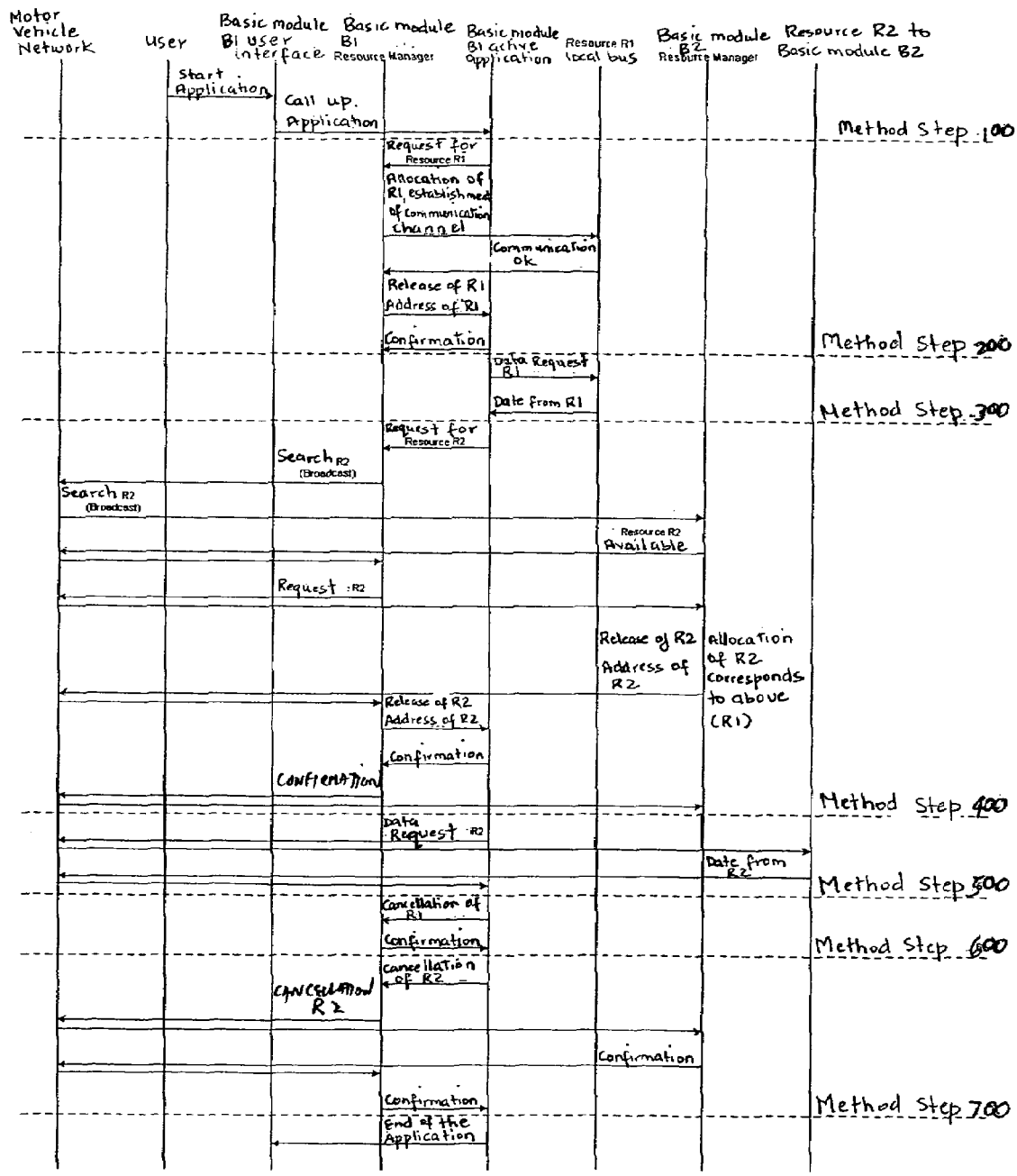
FIG. 3 shows a flow diagram illustrating the use of the divided resources by a software application.

FIG. 3 shows a flow diagram of the use of resources by an application. Every basic module provides basic services that are able to be used by all applications as a result of an appropriate program interface. These services include a messaging service, which provides functions for communicating with other bus stations, and a resource manager, which implements the administration of the expansion modules at the local bus of the bus station.

In method step 100, the user calls up an application via the user interface. The initiated application is performed in bus station B1 and requires two services S1 and S2. Service S1 is addressed first in method step 200. For this purpose, the application directs a request for service S1 to the resource manager of the bus station. The resource manager administers resource R1, which is able to make service S1 available. The resource manager releases R1 for use by the application, establishes a communication channel between R1 and the application, and provides the application with an address for accessing R1.

In method step 300, the application uses resource R1, the communication occurring without the participation of the resource managers.

In method step 400, the application addresses service S2. As in method step 200, the resource manager of the bus station is queried. However, since the bus station does not have any resources for implementing service S2, the resource manager directs the request to the resource manager of all other bus stations that can be contacted via the motor-vehicle bus system. The resource manager of bus station B2 is able to provide the service and offers it to B1, which requests the service of B2. The resource manager at B2 allocates resource R2 in the same manner as in method step 200, and transfers access rights and the address to the resource manager at B1, which relays them to the application.

In method step 500, the application uses resource R2. None of the resource managers are needed for the communication between application and resource. Since the communication is implemented via functions of the messaging service, there is no difference for the application between a resource locally available at B1 and a resource of another bus station contacted via the motor-vehicle network.

In method step 600, resource R1, which is no longer needed by the application, is cancelled. This occurs in that the resource manager is contacted and then disconnects the communication channel between R1 and the application. Method step 700 correspondingly shows the cancellation of resource R2 by the application at the resource manager of bus station B1. The resource manager at B1 contacts the resource manager of bus station B2 and completes the cancellation.

What is claimed is:

1. A bus station connectable via a first bus in a vehicle to other bus stations, the bus station comprising:
    a basic module; and
    expansion modules;
    wherein:
        the basic module connects the bus station to the first bus and connects to the expansion modules via at least one second bus,
        the expansion modules are operable to perform a called-up service,
        the bus station is able to access the other bus stations via the basic module to perform the called-up service, and
        the other bus stations each include a basic module and expansion modules.

2. The bus station of claim 1, wherein the basic module is configured as a bus master for the at least one second bus.

3. The bus station of claim 1, wherein the expansion modules are configured as infotainment components.

4. The bus station of claim 1, wherein the basic module prevents access by the other bus stations to safety-related expansion modules.

5. The bus station of claim 1, wherein at least one of the expansion modules is configured as a send/receive station, via which the bus station and the other bus stations are accessable from outside the vehicle.

6. The bus station of claim 1, wherein the basic module of the bus station access the basic modules and expansion modules of the other bus stations as a function of a bus traffic load of the first bus.

7. A bus comprising:
    a connecting arrangement to connect a bus station having a basic module and expansion modules, the bus station being able to access basic and expansion modules of other bus stations via the bus, wherein:
        the basic module connects the bus station to the bus and connects to the expansion modules via at least one second bus,
        the expansion modules are operable to perform a called-up service, and
        the bus station is able to access the other bus stations via the basic module to perform the called-up service.

8. A basic module comprising:
    a first connecting arrangement to connect to a first bus;
    a second connecting arrangement to connect to a second bus; and
    a transmitting arrangement to transmit data between the first bus and the second bus;
    wherein the basic module is configured as a bus master for the second bus, wherein the basic module is for use in a bus station that includes:
    the basic module, and
    expansion modules;
    wherein:
        the basic module connects the bus station to the first bus and connects to the expansion modules via the second bus,
        the expansion modules are operable to perform a called-up service,
        the bus station is able to access other bus stations via the basic module to perform the called-up service, and
        the other bus stations each include a basic module and expansion modules.

9. A bus station connectable via a first bus in a vehicle to other bus stations, the bus station comprising:
    a basic module; and
    expansion modules;
    wherein:
        the basic module connects the bus station to the first bus and connects to the expansion modules via at least one second bus,
        the expansion modules are operable to perform a called-up service,
        the bus station is able to access the other bus stations via the basic module to perform the called-up service,
        the other bus stations each include a basic module and expansion modules, connected to at least one secondary bus,
        the other bus stations are connected to the first bus, and
        the basic module is able to control communications between the expansion modules connected to the second bus and the other bus stations.

10. The bus station of claim 9, wherein the basic module is configured as a bus master for the at least one second bus.

11. The bus station of claim 9, wherein the expansion modules are configured as infotainment components.

12. The bus station of claim 9, wherein the basic module prevents access by the other bus stations to safety-related expansion modules.

13. The bus station of claim 9, wherein at least one of the expansion modules is configured as a send/receive station, via which the bus station and the other bus stations are accessable from outside the vehicle.

14. The bus station of claim 9, wherein the basic module of the bus station access the basic modules and expansion modules of the other bus stations as a function of a bus traffic load of the first bus.

* * * * *